United States Patent
van Hout et al.

(10) Patent No.: US 6,339,138 B1
(45) Date of Patent: Jan. 15, 2002

(54) METHOD OF MANUFACTURING POLYCARBONATES

(75) Inventors: Henricus Hubertus Maria van Hout, Halsteren (NL); Akio Ikeda; Takato Kimura, both of Ichihara (JP); Patrick Joseph McCloskey, Watervliet, NY (US); Tomoaki Shimoda, Ichihara (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/418,345

(22) Filed: Oct. 14, 1999

(30) Foreign Application Priority Data

Nov. 4, 1998 (JP) .......................... 10-313705
Nov. 4, 1998 (JP) .......................... 10-313706
Nov. 4, 1998 (JP) .......................... 10-313707
Nov. 4, 1998 (JP) .......................... 10-313708

(51) Int. Cl.⁷ .............................. C08G 64/00
(52) U.S. Cl. .................... 528/196; 528/198
(58) Field of Search ................. 528/196, 198

(56) References Cited

U.S. PATENT DOCUMENTS

| | | | |
|---|---|---|---|
| 4,774,315 A | 9/1988 | Miller | 528/179 |
| 5,026,817 A | 6/1991 | Sakashita et al. | 528/199 |
| 5,028,690 A | 7/1991 | Gallucci | 528/481 |
| 5,043,203 A | 8/1991 | Fyvie et al. | 528/198 |
| 5,097,002 A | 3/1992 | Sakashita et al. | 528/199 |
| 5,142,018 A | 8/1992 | Sakashita et al. | 528/199 |
| 5,276,129 A | 1/1994 | Sakashita et al. | 528/198 |
| 5,399,659 A | 3/1995 | Kuhling et al. | 526/65 |
| 5,414,057 A | 5/1995 | Campbell et al. | 525/462 |
| 5,468,836 A | 11/1995 | Okano et al. | 528/204 |
| 5,606,007 A | 2/1997 | Sakashita et al. | 528/176 |
| 5,606,008 A | 2/1997 | Sakashita et al. | 528/199 |
| 5,644,017 A | 7/1997 | Drumright et al. | 528/196 |
| 5,652,313 A | 7/1997 | Kühling et al. | 526/65 |
| 5,668,202 A | 9/1997 | Hirata et al. | 524/154 |
| 5,717,056 A | 2/1998 | Varadarajan et al. | 528/196 |
| 5,905,135 A | 5/1999 | Idage et al. | 528/196 |

FOREIGN PATENT DOCUMENTS

| | | |
|---|---|---|
| EP | 0520805 | 12/1992 |
| EP | 0694572 | 1/1996 |
| EP | 0719815 | 7/1996 |
| EP | 0736558 | 10/1996 |
| EP | 0832910 | 4/1998 |
| JP | 62207358 | 9/1987 |
| JP | 4046928 A | 2/1992 |
| JP | 4089824 A | 3/1992 |
| JP | 4175368 A | 6/1992 |
| JP | 5009281 A | 1/1993 |
| JP | 6009768 A3 | 1/1994 |
| JP | 06329784 | 11/1994 |
| JP | 7053704 A | 2/1995 |

OTHER PUBLICATIONS

PCT International Search Report for International Application No. PCT/US99/24744, filed Oct. 22, 1999.

Primary Examiner—Terressa M. Boykin

(57) ABSTRACT

The manufacture of polycarbonates can be accomplished via an ester interchange reaction of a dihydroxy compound and a carbonic acid diester. The method, which can be a single or multi-stage process wherein the total amount of alkali metal compounds and alkaline earth metal compounds contained as impurities is $1 \times 10^{-7}$ moles or less per mole of dihydroxy compound used as raw materials, and the catalyst employed is an ammonium and/or phosphonium compound, a compound which decomposes or volatilizes at a temperature of 100 to 300° C., and/or an alkali metal phosphorous containing inorganic salt and/or alkaline earth metal phosphorous-containing inorganic salt.

12 Claims, 1 Drawing Sheet

METHOD OF MANUFACTURING POLYCARBONATES

Figure 1:
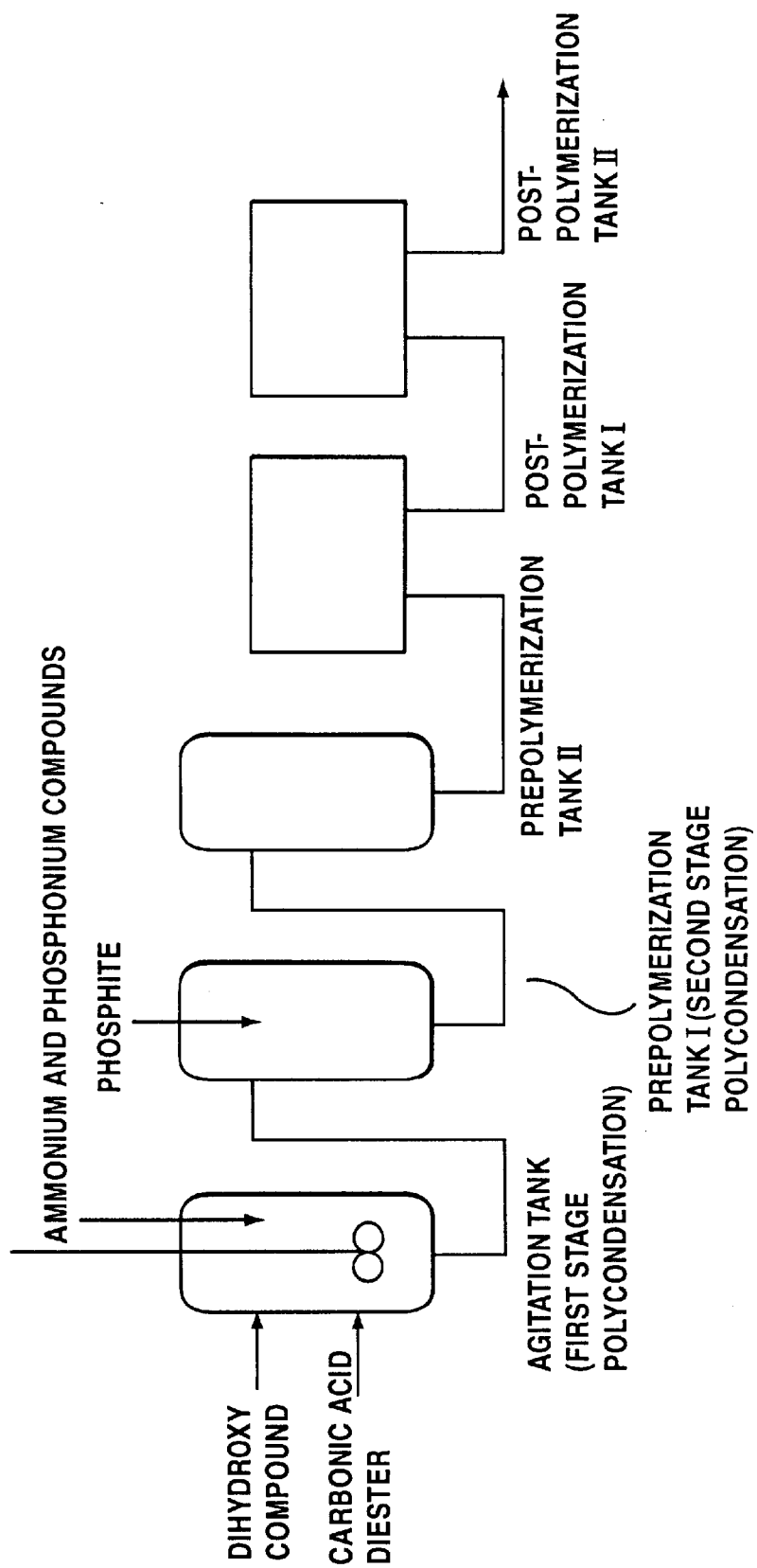

The present application is a U.S. non-provisional application based upon and claiming priority from Japanese Application Nos. HEI 10-313705, HEI 10-313706, HEI 10-313707, and HEI 10-313708, which are hereby incorporated by reference.

BACKGROUND OF THE INVENTION

This invention relates to a manufacturing method of polycarbonates by an ester interchange reaction. More specifically, it relates to a manufacturing method of high molecular weight aromatic polycarbonates with improved color by an ester interchange reaction of an aromatic dihydroxy compound with a carbonic acid diester.

Recently, aromatic polycarbonates have been widely adopted for use as engineering plastics in many fields because of their excellent mechanical properties such as high impact resistance and other excellent characteristics such as heat resistance and transparency.

The so-called phosgene method of manufacturing aromatic polycarbonates is used commercially, whereby an aromatic dihydroxy compound such as bisphenol is reacted with phosgene by interfacial polycondensation. However, the phosgene method currently employed in industry is associated with a number of problems, including the highly toxic nature of phosgene, the need for handling of large quantities of sodium chloride generated as a by product, and the public health and environmental issues associated with methylene chloride, the solvent conventionally used in this reaction.

In addition to use of the phosgene method, it is known that an ester interchange reaction (melt method) between an aromatic dihydroxy compound and a carbonate diester using an alkali metal salt as the catalyst may be utilized to manufacture aromatic polycarbonates. This method of manufacturing aromatic polycarbonates has attracted recent attention because it is inexpensive. Also, toxic substances such as phosgene and methylene chloride are not required, so it is more advantageous from a health and environmental perspective.

To achieve high molecular weight polycarbonates with excellent mechanical properties when manufacturing polycarbonates by this melt method, the unreacted monomers such as bisphenol and diphenyl carbonate must be distilled from the highly viscous polycarbonate melt. This requires that the polycarbonate products be subjected to high temperatures of 250 to 330° C., under a high vacuum over long periods under high vacuum. However, the melt method is often associated with problems in achieving excellent quality in terms of a balance between color and high molecular weight. This is due to the alkali metal acting as a catalyst in the ester interchange reaction and the occurrence of side reactions such as decarboxylation and the Kolbe-Schmitt reaction. These side reactions produce branched polycarbonates (as shown in the formula below), generate cross linked products and cause coloring of the polycarbonate produced ("Polycarbonate Resins," Nikkan Kogyo Shinbun, Sep. 30, 1969.)

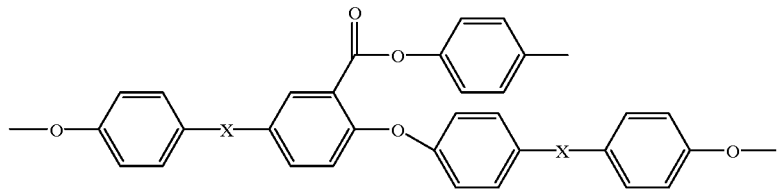

(X indicates a linear or branched chain hydrocarbon group).

As a means to solve these problems, Japanese Patent No. H4-89824 disclosed the use of (1) nitrogen containing basic compounds, (2) alkali metal compounds or alkaline earth metal compounds, and (3) boric acid or borate ester compounds as catalysts. Japanese Patent No. H4-46928 disclosed the use of (1) electron donor amine compounds and (2) alkali metal compounds or allkaline earth metal compounds as catalysts. Japanese Patent No. H4-175368 disclosed a method whereby melt polymerization in the presence of an alkaline compound catalyst was carried out, followed by the addition of acidic compounds and epoxy compounds to the reaction products.

However, although the above disclosed methods helped to improve problems such as coloring, they did not always produce satisfactory results.

In addition, Japanese Patent No. H7-53704 disclosed a method of manufacturing polycarbonates that reduced side reactions and improved color. That manufacturing method of polycarbonates described (1) a single compound produced from (a) an alkali metal compound or al alkaline earth metal compound and (b) a non-volatile acid; or (2) a mixture from (a) an alkali metal compound or an alkaline earth metal compound and (b) a non-volatile acid. The described single compound or the mixture was then rendered weakly acidic in an aqueous solution and used as a catalyst. However, the rate of polymerization achieved by that disclosed method was not completely satisfactory.

We (the inventors) successfully accomplished the present invention through diligent research efforts, taking into consideration the various types of problems described above. We have invented a means to efficiently manufacture polycarbonates wherein side reactions are inhibited and color is improved.

BRIEF SUMMARY OF THE INVENTION

This invention is a method to manufacture polycarbonates by means of an ester interchange reaction of a dihydroxy compound and carbonate diester. The method utilizes a dihydroxy compound and a carbonate diester as raw materials, in which the total amount of impurities (alkali metal compounds and alkaline earth metal compounds) is no greater than $1\times10^{-7}$ mole per 1 mole of the dihydroxy compound. The reaction is catalyzed by an alkali metal phosphite per 1 mole of the dihydroxy compound. Preferably, $1\times10^{-7}$ to $2\times10^{-6}$ mole of alkali metal phosphite per 1 mole of the dihydroxy compound should be used. The alkali metal phosphite should be at least one compound selected from among the group of lithium dihydrogen phosphite, sodium dihydrogen phosphite, and potassium dihydrogen phosphite.

DETAILED DESCRIPTION OF THE INVENTION

The following are further details of this invention relating to a method for manufacturing polycarbonates.

First, an explanation is presented about the raw materials for polycondensation used as the manufacturing method for polycarbonates related to this invention.

Raw Material For Polycondensation

A dihydroxy compound and a carbonic acid diester are used as raw materials for the polycondensation.

There is no particular restriction on the type of dihydroxy compound that can be employed. For example, bisphenol compounds represented by the general formula (I) below can be used

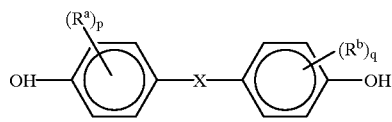

(In the formula $R^a$ and $R^b$ each represent a halogen atom or a monovalent hydrocarbon group and may be the same or different. The p and q represent integers from 0 to 4.

The X represents

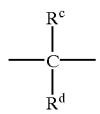

or

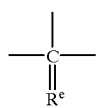

$R^c$ and $R^d$ each represent a hydrogen atom or a monovalent hydrocarbon group, and may form cyclic structure. $R^e$ is a divalent hydrocarbon group.)

Specific examples of the types of bisphenol compounds that may be represented by formula [I] above include the following:
1,1-bis(4-hydroxypenyl) methane;
1,1-bis(4-hydroxypenyl) ethane;
2,2-bis(4-hydroxypenyl) propane (hereinafter referred to as "bisphenol A");
2,2-bis(4-hydroxypenyl) butane;
2,2-bis(4-hydroxypenyl) octane;
1,1-bis(4-hydroxypenyl) propane;
1,1-bis(4-hydroxypenyl) n-butane;
bis(4-hydroxypenyl) phenylmethane;
2,2-bis(4-hydroxy-1-methylpenyl) propane;
1,1-bis(4-hydroxy-t-butylpenyl) propane;
2,2-bis(4-hydroxy-3-bromophenyl) propane and other bis (hydroxyalyl) alkanes;
1,1-bis(4-hydroxypenyl) cyclopentane;
1,1-bis(4-hydroxypenyl) cyclohexane and other bis (hydroxyaryl) cycloalkanes;

The X in the bisphenol shown in the above formula may represent and —O—, —S—, —SO—, or —SO$_2$— group, for example:
4,4'-dihyrdoxydiphenyl ether;
4,4'-dihyrdoxy-3,3'-dimethyldiphenyl ether and other bis (hydroxyaryl) ether;
4,4'-dihyrdoxydiphenyl sulfide;
4,4'-dihyrdoxy-3,3'-dimethyldiplhenyl sulfide and other bis (hydroxydiaryl) sulfide;
4,4'-dihyrdoxydiphenyl sulfoxide;
4,4'-dihyrdoxy-3,3'-dimethyldiphenyl sulfoxide and other bis(hydroxydiaryl) sulfoxide;
4,4'-dihyrdoxydiphenyl sulfone;
or 4,4'-dihyrdoxy-3,3'-dimethyldiphenyl sulfone and other bis(hydroxydiaryl) sulfone.

In addition, the bisphenol used may be a compound represented by formula [II] below.

(In the formula, $R^f$ may represent a halogen atom, a hydrocarbon group containing 1 to 10 carbon atoms, or a halogen substituted hydrocarbon group. The n represents an integer from 0 to 4. If n is 2 or greater, the groups represented by $R^f$ may be the same or different.)

More specifically, the bisphenol represented by formula [II] may be, for example: resorcinol; a substituted resorcinol compound such as 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, and 2,3,4,6-tetrabromoresorcinol; catechol; hydroquinone; or a substituted hydroquinone compound such as 3-methylhydroquinone, 3-ethylhydroquinone, 3-propylhydroquinone, 3-butylhydroquinone, 3-t-butylhydroquinone, 3-phenylhydroquinone, 3-cumylhydroquinonic, 2,3,5,6-tetramethylhydroquinone, 2,3,5,6-tetra-t-butylhydroquinone, 2,3,5,6-tetrafluorohydroquinone, and 2,3,5,6-tetrabromohydroquinone.

The bisphenol used may also be a compound represented by the formula below such as: 2,2,2',2'-tetrahydro-3,3,3',3'-tetramethyl- 1,1'-spirobi-[1H-indene]-6,6'-diol.

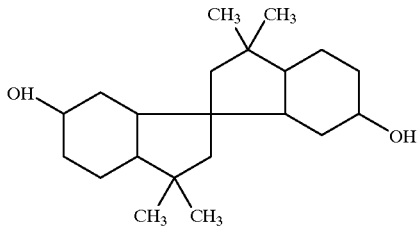

Of the above compounds, of which 2 or more can also be combined by copolymerization to manufacture polycarbonates, the bisphenols represented by formula [I] are preferable, in particular, bispheniol A.

Examples of the carbonic acid diester compound that can be used include:
diphenyl carbonate, bis(2,4-dichlorophenyl) carbonate, bis(2,4,5-trichlorophenyl) carbonate, bis(2-cyanophenyl) carbonate, bis(o-nitrophenyl) carbonate, ditolyl carbonate, m-cresyl carbonate, dinapthyl carbonate, bis(diphenyl) carbonate, diethyl carbonate, dimethyl carbonate, dibutyl carbonate and dicylcohexyl carbonate, and combinations of two or more thereof; with diphenyl carbonate preferred.

The carbonic acid diesters employed may also contain one or a combination of two or more dicarboxylic acids and dicarboxylic acid esters. Specifically, for the carbonic acid diester, dicarboxylic acids or the dicarboxylic acid esters should preferably be present at 50 mole percent or less, and more preferably in an amount of 30 mole percent or less.

Examples of these dicarboxylic acids or dicarboxylic acid esters include: terephthalic acid, isophthalic acid, sebacic acid, decanediolc acid, dodecanedioic acid, diphenyl sebacata, diphenyl terephthalate, diphenyl isophthalate, diphenyl decanedioate, and diphenyl dodecanedioate.

Polycondensation of a carbonic acid diester containing the above types of dicarboxylic acids and/or dicarboxylic acid esters with the previously mentioned aromatic dihydroxy compounds can also be used to manufacture polyester polycarbonates.

During the manufacture of polycarbonates, the amount of the above types of carbonic acid diesters should be in an amount of 0.95 to 1.30 moles, and more preferably in an amount of 1.01 to 1.20 moles, per 1 mole used of the aromatic dihydroxy compound. Furthermore, a copolymer polycarlbonate can be manufactured by using one or more polyfunctional compounds having three or more functional groups per molecule may be used in addition to the above-mentioned aromatic dihydroxy compounds and carbonic acid diesters to manufacture polycarbonates by copolymerization.

These types of polyfunctional compounds should preferably be those having phenolic hydroxyl groups or carboxyl groups, with compounds having three phenolic hydroxyl groups preferred. Specific examples include:
1 1,1-tris(4-hydroxyphenyl) ethane;
2,2', 2"-tris(4-hydroxyphenyl) diisopropylbenzene;
α-methyl-α,α', α'-tris(4-hydroxyphenyl)-1,4-diethylbenzene;
α, α', α"-tris(4-hydroxyphenyl)-1,3,5-triisopropylbenizenie;
phloroglucinol;
4,6-dimethyl-2,4,6-tri(4-hydroxyphenyl)-heptane-2; 1,3,5-tri(4-hydroxyphenyl)benzene;
2,2-bis[4,4-(4,4'-dihydroxyphenyl)-cyclohexyl]-propane;
trimellitic acid;
1,3,5-benzene tricarboxylic acid;
and pyromellitic acid.

Of the above compounds, 1 1,1-tris(4-hydroxyphenyl) ethane, α, α',α"-tris(4-hydroxyphenyl)-1,3,5-triisopropylbenzene, and the like can be used to particular advantage.

When using these types of polyfunctional compounds, the amount of polyfunctional compound used should generally be in an amount of 0.03 mole or less, preferably 0.001 to 0.02 mole, and even more preferably 0.001 to 0.01 mole, per mole of the total amount of the aromatic dihydroxy compound.

The raw materials used are such that the amounts of alkali metal compound and alkaline earth metal compound contained in the above-mentioned dihydroxy compound and the carbonic acid diester are limited to the amount at which catalytic performance is exhibited (hereinafter referred to as the effective catalytic amount), up to $5 \times 10^{-7}$ mole. In one embodiment, an amount sufficient to exhibit catalytic performance, but less than $1 \times 10^{-7}$ mole is preferred, while in another embodiment $1 \times 10^{-7}$ to $5 \times 10^{-7}$ mole is preferred with $2 \times 10^{-7}$ to $4 \times 10^{-7}$ mole of sodium hydroxide per mole of dihydroxy compound especially preferred.

There will be a decrease in polymerization activity if the amounts of alkali metal compound and alkaline earth metal compound contained in the dihydroxy compound and the carbonic acid diester is less than $1 \times 10^{-7}$ mole of sodium hydroxide per mole of dihydroxy compound, but the coloring will worsen and branching will increase if these amounts are greater than $5 \times 10^{-7}$ of sodium hydroxide per mole of dihydroxy compound.

The actual catalytic amount of the alkali metal compound and/or alkaline earth metal compound in the raw materials can be directly quantified, usually by titration, but it is exceedingly difficult to measure by titration the effective catalytic amount equivalent to a minute amount of sodium hydroxide as above. Consequently, it is surmised that it is accurate and ideal to determine the amount at which the alkali metal compound and/or alkaline earth metal compound contained in the raw materials effectively act as ester interchange reaction catalysts (effective catalytic amount).

In specific terms, the effective catalytic amount can be determined as follows:

In advance, a calibration curve is produced to express the relationship between the catalytic amount when the bisphenol and the carbonic acid diester are subjected to an ester interchange reaction (the amount at which the compounds effectively act as catalysts) and the degree of ester interchange reaction. Here, the amount of sodium hydroxide of the bisphenol per mole of pure bisphenol is termed the catalytic amount. A "pure bisphenol" is a bisphenol that contains substantially no acidic or basic impurities. The degree of ester interchange reaction can be determined, for instance, as the amount of oligomers, phenols, and unreacted bisphenol or carbonic acid diester produced by the reaction, which can be measured with a near infrared meter, refractometer, high performance liquid chromatograph, or another such analysis apparatus.

By measuring the degree of ester interchange reaction when the bisphenol containing an alkali metal compound and/or an alkaline earth metal compound and the carbonic acid diester manufactured as above are subjected to an ester interchange reaction under the same conditions (temperature and pressure) as in the ester interchange reaction conducted in the production of the calibration curve, we can determine from the above-mentioned calibration curve the amount at which the alkali metal compound and/or alkaline earth metal compound contained in the raw materials effectively act as ester interchange reaction catalysts, that is, the effective catalytic amount of the bisphenol as the amount having the same catalytic activity as sodium hydroxide per mole of pure bisphenol.

Raw materials for which the effective catalytic amount has thus been controlled can be obtained by adding an alkali metal compound or alkaline earth metal compound to the product of refining a dihydroxy compound and a carbonic acid diester by distillation, recrystallization, or another such method using a manufacturing apparatus that is very controlled in terms of accuracy.

Examples of the alkali metal compound and/or alkaline earth metal compound include organic acid salts, inorganic acid salts, oxides, hydroxides, hydrides, alcoholates, and the like of alkali metals and alkaline earth metals, specific examples of which include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenide, sodium benzoate, potassium benzoate, lithium benzoate, a disodium salt, dipotassium salt, or dilithium salt of bisphenol A, a sodium salt, potassium salt, or lithium salt of a phenol, and other such alkali metal compounds; and calcium hydroxide, barium hydroxide, magnesium hydroxide, strontium hydroxide, calcium hydrogencarboliate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

Furthermore, the polycarbonates may be manufactured in a closed system wherein the apparatus for manufacturing the raw materials and the apparatus for manufacturing the polycarbonates are directly connected. Manufacturing of polycarbonates by this type of closed system can help to eliminate mixing in of impurities.

During the manufacture of polycarbonates described in this invention, a chain termination agent may also be used with the above-mentioned aromatic dihydroxy compounds and carbonic acid diesters.

The termination agent used may be an aryloxy compound capable of introducing terminal groups, represented by the general formula [IV] below, that can be introduced as a terminal group to the end of the manufactured polycarbonate molecules.

$$ArO— \qquad [IV]$$

In the formula, Ar represents an aromatic hydrocarbon group containing 6 to 50 carbon atoms. There is no specific restriction on the type of aromatic hydrocarbon group, which may be a condensed ring structure such as a phenyl group, naphthyl group, anthranyl group, or the like, or one of these aromatic rings may form a ring saturated with a hydrocarbon atom(s), a hetero atom and/or different atoms may form cyclic structures. In addition, these aromatic rings may be substituted with a halogen or alkyl group containing 1 to 9 carbon atoms.

These types of aryloxy compounds may include: phellol, diphenyl carbonate, p-tert-butylphenol, p-tert-butylphenylphenyl carbonate, p-tert-butylphenyl carbonate, p-cumylphenol, p-cumylphenylphenyl carbonate; 2,2,4-trimethyl-4-(4-hydroxyphenyl) chroman, 2,2,4,6-tetramethyl-4-(3,5-dimethyl-4-hydroxyphenyl) chroman, 2,2,3-trimethyl-3-(4-hydroxyphenyl) chroman, 2,2,3,6-tetramethyl-3-(3,5-dimethyl-4-hydroxyphenyl) chroman, 2,4,4-trimethyl-2-(2-hydroxyphenyl) chroman, and 2,4,4,6-tetramethyl-2-(3,5-dimethyl-2-hydroxyphenyl) chroman, other chroman compounds, as well as one or a combination of the above types of these compounds.

These aryloxy compounds should be present in amount of 0.01 to 0.2 mole, preferably at 0.02 to 0.15 mole, and more preferably at 0.02 to 0.1 mole per 1 mole of the aromatic dihydroxy compound.

If the arloxy compound is used in this amount as a chain terminator, then the molecular terminals of the polycarbonate that is obtained will be terminated with groups expressed by the above-mentioned formula IV in a proportion of 1 to 99%, with 10 to 97% being preferable and 20 to 95% being even better.

A polycarbonate, to which terminal groups represented by the formula [1V] above have been introduced in the above-mentioned ratios, has excellent heat resistance, and in addition, even if of low molecular weight, demonstrates excellent mechanical properties such as high impact resistance.

In addition to the above-mentioned aryloxy compounds, one or more aliphatic monocarboxy compounds capable of introducing one or more aliphatic hydrocarbon units represented by the formula [V] below, can also be introduced as chain terminators.

In the formula, R represents a straight-chain or branched alkyl group

containing 10 to 30 carbon atoms which may be substituted with a halogen.

Specifically, these aliphatic monocarboxy compounds may include one or a combination of: undecanoic acid, laurie acid, tridecanoic acid, pentadecanoic acid, palmitic acid, heptadecanoic acid, stearic acid, nonadecanoic acid, heneicosanoic acid, tricosanoic acid, and melissic acid and other alkyl monocirboxylic acids; and methyl stearate, ethyl stearate, and phenyl stearate and other methyl esters, ethyl esters, and phenyl esters of the above alkylmonocarboxylic acids as well as other alkyl monocarboxylic acid esters.

These types of aliphatic monocarboxy compounds should be present in amounts of 0.01 to 0.20 mole, preferably at 0.02 to 0.15 mole, and more preferably at 0.02 to 0.10 mole, per mole of the aromatic dihydroxy compound. Use of the above types of termination agents in total amounts greater than 0.2 moles per mole of the aromatic dihydroxy compound may reduce the rate of polymerization.

Polycondensation Step

The present invention involves subjecting polycondensation raw materials containing the above-mentioned effective catalytic amount of an alkali metal compound or an alkaline earth metal compound to polycondensation in the presence of a polycondensation catalyst.

Catalyst For Polycondensation

In this invention an (a) alkali metal phosphite, a (b) compound which decomposes or volatilizes at a temperature of 100 to 300° C. and/or an (c) alkali metal phosphorous-containing inorganic salt and/or an alkaline earth metal phosphorous-containing inorganic salt is used as the catalyst for polycondensation.

The alkali metal phosphorus-containing inorganic salt and/or alkaline earth metal phosphorus-containing inorganic salt is a salt of a phosphorus-containing inorganic acid and an alkali metal and/or an alkaline earth metal. Examples of alkali metals include lithium, sodium, potassium, cesium, and rubidium, while examples of alkaline earth metals include magnesium calcium, and Strontium. Examples of phosphorus-containing inorganic acids include phosphorous acid, phosphoric acid, hypophosphorous acid, pyrophosphoric acid, triphosphoric acid, and polyphosphoric acid.

A phosphite of an alkali metal compound is particularly favorable as this (c) alkali metal phosphorus-containing inorganic salt and/or all alkaline earth metal phosphorus-containing inorganic salt, specific examples of which include lithium dihydrogen phosphite ($LiH_2PO_3$), sodium dihydrogen phosphite ($NaH_2PO_3$), potassium dihydrogen phosphite ($KH^2PO_3$), rubidium dihydrogen phosphite ($RbH_2PO_3$), cesium dihydrogen phosphite ($Cs H_2PO_3$), dilithium hydrogen phosphite ($Li_2HPO_3$), disodium hydrogen phosphite ($Na_2HPO_3$), dipotassium hydrogen phosphite ($K_2HPO_3$), dirubidium hydrogen phosphite ($Rb_2HPO_3$), dicesium hydrogen phosphite ($Cs_2HPO_3$), trilithium phosphite ($Li_3PO_3$), trisodium phosphite ($Na_3PO_3$), tripotassium phosphite ($K_3PO_3$), trirubidium phosphite ($Rb_3PO_3$), and tricesium phosphite ($Cs_3PO_3$). One or a combination of 2 or more of these compounds may be used. Of these compounds, which may be used singly or in combination of two or more, lithium dihydrogen phosphite ($LiH_2PO_3$), sodium dihydrogen phosphite ($NaH_2PO_3$), and potassium dihydrogen phosphite ($KH_2PO_3$) are preferable.

These types of alkali metal phosphites, which have excellent catalytic activity, should be present in amounts of $1 \times 10^{-7}$ to $2 \times 10^{-6}$ mole, and preferably at $5 \times 10^{-7}$ to $1.5 \times 10^{-6}$ mole, per mole of the dihydroxy compound.

The (c) alkali metal phosphorus-containing inorganic salt and/or alkaline earth metal phosphorus-containing inorganic salt may be produced by supplying an alkali metal and/or alkaline earth metal compound, such as sodium hydroxide, potassium hydroxide, lithium hydroxide, sodium hydrogencarbonate or potassium hydrogencarbonate, and a phosphorus-containing inorganic acid from separate paths to a raw material agitation vessel or melt polycondensation vessel, and allowing the alkali metal and/or alkaline earth metal compound to react with the phosphorus-containing inorganic acid in the agitation vessel or melt polycondensation vessel.

This (c) alkali metal phosphorus-containing inorganic salt and/or alkaline earth metal phosphorus-containing inorganic salt, which has excellent catalytic activity, is preferably used in an amount of $1 \times 10^{-7}$ to $2 \times 10^{-6}$ mol, and more preferably $5 \times 10^{-7}$ to $5 \times 15^{-6}$ mol, per mole of dihydroxy compound.

When raw materials are used such that the effective catalytic amount in the raw materials is within a specific range, and a (c) alkali metal phosphorus-containing inorganic salt and/or alkaline earth metal phosphorus-containing inorganic salt is used as a polycondensation catalyst, a polycarbonate with good coloring and little branching can be manufactured while maintaining a satisfactory level of activity for practical purposes.

Also, a (b) compound that decomposes or volatilizes at a temperature of 100 to 300° C., e.g., a basic compound, may be used as a catalyst alone or along with the above-mentioned (c) alkali metal phosphorus-containing inorganic salt and/or alkaline earth metal phosphorus-containing inorganic salt. More specifically, at least one compound selected from the group consisting of ammonium compounds and phosphonium compounds is favorable, with at least one compound selected from the group consisting of quaternary ammonium compounds and quaternary phosphonium compounds particularly favorable. Examples of quaternary ammonium compounds include: one or more compounds selected from the group consisting of tetramethylammonium hydroxide ($Me_4NOH$), tetraethylammonium hydroxide ($Et_4NOH$), tetrabutylammonium hydroxide ($Bu_4NOH$), and trimethylbenzylammonium hydroxide and other quaternary ammonium compounds. Examples of quaternary phosphonium compounds include: tetramethylphosphonium hydroxide ($Me_4POH$), tetraethylphosphonium hydroxide ($Et_4POH$), and tetrabutylphosphonium hydroxide ($BU_4POH$) and other Such quaternary phosphonium compounds. These compounds can be used singly or in combination of two or more types.

This (b) compound that decomposes or volatilizes at a temperature of 100 to 300° C. should be used in an amount of $1 \times 10^{-7}$ to $1 \times 10^{-1}$ mol, and preferably $1 \times 10^{-5}$ to $1 \times 10^{-2}$ mol, per mole of dihydroxy compound. The use of a (b) compound that decomposes or volatilizes at a temperature of 100 to 300° C. and a phosphite of an alkali metal compound as catalysts results in fewer terminal OH groups and in a suppression of color deterioration during molding and of the generation of electrostatic charges.

Process of Polycondensation

Polycondensation may be accomplished in a one or two stage process. The one stage process comprises manufacturing polycarbonates by melt polycondensation of the previously mentioned dihydroxy compounds and carbonate diesters in the presence of the above (a) alkali metal phosplites, the (b) compound which decomposes or volatilizes at a temperature of 100 to 300° C., and/or the (c) alkali metal phosphorous-containing inorganic salt and/or alkaline earth metal phosphorous-containing inorganic salt.

The polycondensation reaction for bisphenol compounds with a carbonate diester can be carried out under similar conditions as those for previously known polycondensation reactions.

Specifically, the bisphenol compound and the carbonate diester should be reacted at atmospheric pressure during the first stage reaction at a temperature of 80 to 250° C., preferably at 100 to 230° C., and more preferably at 120 to 190° C., and in general for 0 to 5 hours preferably for 0 to 4 hours, and even more preferably for 0 to 3 hours. The reaction temperature is then raised while the reaction system is reduced in pressure, thus bringing about a reaction between the bisphenol and the carbonic acid diester, and finally the bisphenol and the carbonic acid diester are subjected to a polycondensation reaction at 240 to 320° C. under reduced pressure of 5 mm Hg or less.

Because the manufacturing method of polycarbonates uses a phosphite of an alkali metal and/or an alkaline earth metal as the catalyst for polycondensation, side reactions that occur when conventional alkali metal compounds are utilized are reduced. A polycarbonate with improved color can be manufactured efficiently, while minimizing the production of branched structures such as those represented by the formulas [VI] and [VII] shown below.

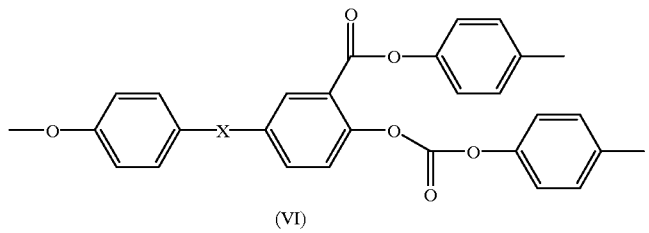

(VI)

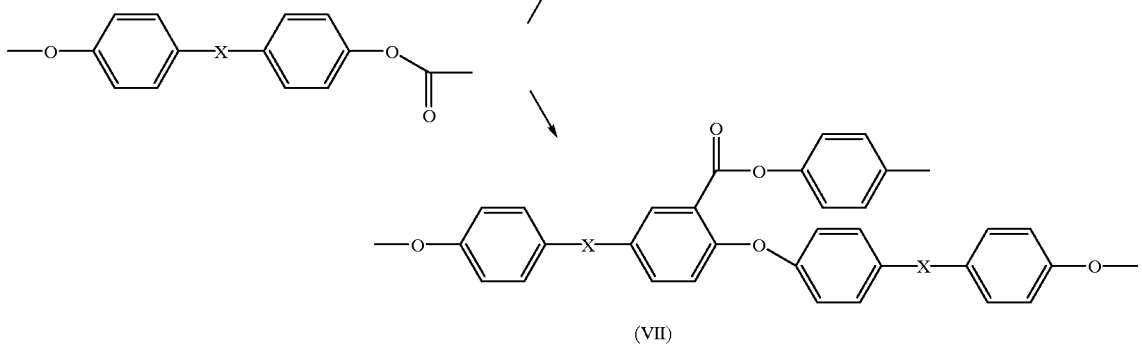

(VII)

Alternatively, the polycarbonate manufacturing method can be a two stage process as will now be described through reference to FIG. 7

First Stage of the Polycondensation Step

First, raw materials including the above-mentioned dihydroxy compound and carbonic acid diester are mixed in an agitation tank or the like, after which they are transferred to a polymerization tank and subjected to polycondensation.

In the first stage of the polycondensation step, at least one type of compound selected from among ammonium compounds and phosphonium compounds (as discussed above) is used as a catalyst.

The mixing of the polycondensation raw materials and the catalyst usually should be conducted in a nitrogen atmosphere at atmospheric pressure.

The first stage of the polycondensation step is preferably conducted at a temperature of 270° C. or lower, with 80 to 250° C. preferable, 100 to 230° C. more preferred, and 120 to 190° C. especially preferred. The reaction duration here should be 0 to 5 hours, with 0 to 4 hours preferred and 0 to 3 hours especially preferred, wherein the pressure here should be from atmospheric pressure to 1 00 torr, with a nitrogen atmosphere preferred.

Second Stage of the Polycondensation Step

Next, an alkali metal phosphorus-containing inorganic salt and/or an alkaline earth metal phosphorus-containing inorganic salt is added as a catalyst to the polycondensation product obtained in the first stage of the reaction, and further polycondensation is conducted.

This alkali metal phosphorus-containing inorganic salt and/or alkaline earth metal phosphorus-containing inorganic salt may be added in its entire amount in the second stage, or it may be added in batches in the second and subsequent stages so that the total amount is within the range given above.

It is preferable in the second and subsequent stages of the polycondensation step for the reaction temperature to be raised while the reaction system is reduced in pressure compared to the first stage, thus bringing about a reaction between the bisphenol and the carbonic acid diester, and for the bisphenol and the carbonic acid diester finally to be subjected to a polycondensation reaction at 240 to 320° C. under reduced pressure of 5 mm Hg or less, and preferably 1 mm Hg or less.

The compound selected from among ammonium compounds and phosphonium compounds that is used as a catalyst in the first stage of the polycondensation step will volatilize under the reduced-pressure and heating polycondensation conditions in the second and subsequent stages. Accordingly, the polymerization can be sustained longer if the alkali metal phosphorus-containing inorganic salt and/or alkaline earth metal phosphorus-containing inorganic salt is used as a polycondensation catalyst in the second and subsequent stages of the polycondensation step.

When the compound selected from among, ammonium compounds and phosphonium compounds used as a catalyst in the first stage of the polycondensation step is mixed with the alkali metal phosphorus-containing inorganic salt and/or alkaline earth metal phosphorus-containing inorganic salt used as a catalyst in the second stage of the polycondensation step, the two may react and produce a hydroxide of the alkali metal and/or alkaline earth metal, but if the compound selected from among ammonium compounds and phosphonium compounds and the alkali metal phosphorus-containing inorganic salt and/or alkaline earth metal phosphorus-containing inorganic salt are used in different polycondensation stages, no hydroxide of the alkali metal and/or alkaline earth metal will be produced. Furthermore, side reactions such as those given below that result from the presence of this hydroxide will therefore be suppressed even better, there will be less production of the branched structures expressed by formulas [VI] and [VII], shown above, and a polycarbonate with improved coloring can be manufactured efficiently.

Employing either of the above manufacturing methods makes it possible to obtain a polycarbonate with excellent coloring (hereinafter referred to as a polycarbonate [A]) at a high polymerization activity.

The manufacturing method pertaining to the present invention is not limited to what is depicted in FIG. 1, and may be either a continuous or batch process. The reaction apparatus used in conducting this reaction may be a horizontal type, tube type, or column type. Furthermore, there are preferably at least two polymerization stages, although there are no particular restrictions on the number of stages.

The intrinsic viscosity of the polycarbonate obtained in this manner, as measured in 20° C. methylene chloride, is usually 0.10 to 1.0 dL/g, with 0.30 to 0.65 dL/g being preferable.

With the polycarbonate manufactured by the method pertaining to the present invention, it is preferable for the branch structure expressed by formula [VI] to be present in an amount of 1500 ppm or less, more preferably 1000 ppm or less, and most preferably 800 ppm or less, and for the branch structure expressed by formula [VII] to be present in an amount of 200 ppm or less, more preferably 100 ppm or less, and most preferably 50 ppm or less.

For quantitative determination of these branched compounds, an alkali such as sodium hydroxide can be added to the manufactured polycarbonates in order to hydrolyze and generate the branched compounds represented by the formulas [VI'] and [VII'] shown below. The quantities of these compounds can then be assayed by high performance liquid chromatography (HPLC).

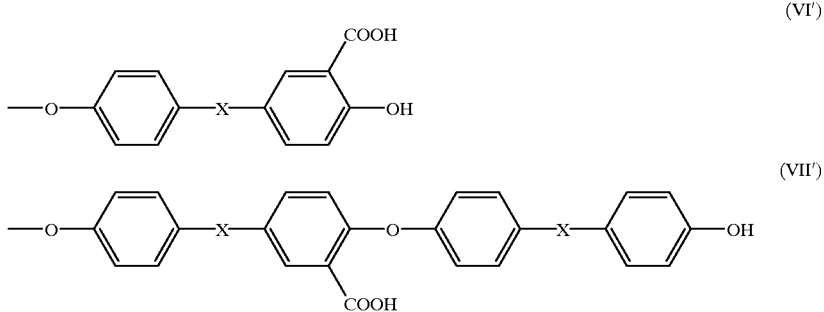

(X represents a linear or branched chain hydrocarbon group.)

In this invention, the [A] polycarbonate reaction product obtained as described above does not have to be cooled. Instead, immediately after the polycondensation reaction, a derivative such as [B] below, formed from a sulfur containing acidic compound with a pKa value of 3 or less and/or a derivative formed from the acidic compound (hereinafter also referred to as the [B] acidic compound), may be added.

Examples of the [B] acidic compound include: sulfurous acid, sulfuric acid, sulfonic acid, a sulfine-based compound, a sulfone-based compound, or any related derivative. Specific examples include: ethyl benzenesulfonate, butyl bezenesulfonate, methyl p-toluenesulfonate, ethyl p-toluenesulfonate and butyl p-tuluenesulfonate.

This [B] acidic compound should be contained in all amount of 0.1 to 50 times (molar), and preferably 0.1 to 15 times (molar), and more preferably 0.1 to 7 times (molar), with respect to the combined amount of the alkali or alkaline earth metal compound contained in the dihydroxy compound and the carbonic acid diester, and the alkali metal phosphorus-containing inorganic salt used in the reaction of the above-mentioned [A] polycarbonate. When the acidic compound [B] is added in this amount to the reaction product (polycarbonate) [A], the phosphites of alkali metals remaining in the polycarbonate will be neutralized or weakened [in alkalinity], allowing a polycarbonate ultimately to be obtained with even better water resistance and residence stability.

Furthermore, [C] water may also be added with the above [B] acidic compounds. The amount of [C] water added to the polycarbonate [A] should be 5 to 1000 ppm, preferably 10 to 500 ppm, and more preferably 20 to 300 ppm. The addition of the [B] acidic compound and [C] water will further increase the efficiency of neutralization of the polycondensation catalyst in the [A] polycarbonate and can result in the production of a polycarbonate with good stability during melting and superior color, transparency, moisture resistance, and weather resistance.

The molding of the [A] polycarbonate is performed with an ordinary kneader, such as a uniaxial extruder, biaxial extruder, or static mixer, and these kneaders can be used effectively whether or not they are vented.

Furthermore, the [B] acidic compound and [C] water may be added while the [A] polycarbonate obtained by the polycondensation reaction is in a molten state within the reactor or extruder, and the [B] acidic compound and [C] water may be added separately or simultaneously with no restrictions on the order of addition. Simultaneous addition is preferred.

Additives [D] may also be added to the polycarboniate [A] product as long as they do not adversely effect the basic objectives of this invention. These additives [D] include a wide range of substances that are conventionally added to polycarbonates for a variety of purposes. Specific examples include: thermal stabilizers, epoxy compounds, ultraviolet absorbers, mold release agents, colorants, antistatic agents, slipping agents, anti-blocking agents, lubricants, anti-fogging agents, natural oils, synthetic oils, waxes, organic fillers, and inorganic fillers.

This invention provides a method of efficiently manufacturing polycarbonates with improved color, yet at the same time inhibits side reactions and minimizes branching. The polycarbonates produced can be pelletized, and are ideal for a number of applications, including use as general molding materials, as sheets and other construction materials, as headlight lenses for automobiles, as eyeglasses, optical lenses, optical recording materials, and other optical materials, as well as other applications. These polycarbonates arc especially ideal for use as an optical molding material.

The following examples provide more detailed explanations about this invention. However, this invention is not limited to these working examples.

EXAMPLES

Properties demonstrated by working examples of this invention are measured in the following manner.

[Quantitative Analysis of Alkali Metals and Alkaline Earth Metals in Raw Materials]

Samples of the raw materials were placed in a clean bottle and analyzed by conventional atomic absorption methods to determine the presence of each constituent to the "parts per billion" (ppb) level.

[Polycarbonate Intrinsic Viscosity(IV)]

Intrinsic viscosity was measured with a Ubbellolhde viscometer at 20° C. in methylene chloride (0.5 g/dl).

[Polycarbonate Hue (Yellow Index: YI)]

A 3-mm injection molded plate of polycarbonate was prepared (cylinder temperature, 290° C.; injection pressure, 1000 Kg/cm; 1 cycle, 45 sec; mold temperature, 100° C.). A color and color difference meter (ND-1001 DP, Nihon Kenshoku Kogyo) was used to measure X, Y and Z values by a transmittance method in order to determine the yellow index (YI).

$$YI=100\ (1.277\ X-1.060Z)/Y$$

[Concentration of Polycarbonate Terminal OII Groups]

A 0.4 g sample of the product was dissolved in 3 ml of chloroform. The ratio (%) of terminal OH groups to the total concentration of terminal groups was then calculated by carbon-13 nuclear magnetic resonance (NMR).

[Determination of Polycarbonate Branching]

The amount of branching was determined by quantitative analysis for the two types of compounds represented by formulas (1) and (2) below. This was accomplished by alkali hydrolysis of the polycarbonate products followed by analysis with high-performance liquid chromatography (HPLC).

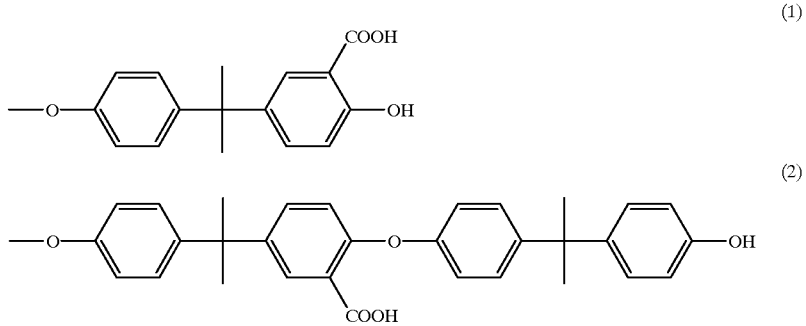

Working Examples 1, 10, 33

The apparatus used for polycarbonate polymerization included on agitator vessel to mix the raw materials, two prepolymerization vessels, and two horizontal polymerization vessels. The apparatus is shown in FIG. 1. The conditions for each reaction are shown in table 1 below.

TABLE 1

|  | Pressure (torr) | Temperature (° C.) | Mean Residence Time (hr) |
|---|---|---|---|
| Agitator vessel | Atmospheric Pressure (nitrogen atmosphere) | 160 | 2 |
| Prepolymerization vessel I | 100 | 230 | 1 |
| Prepolymerization vessel II | 20 | 270 | 0.5 |
| Horizontal polymerization vessel I | 2 | 305 | 0.5 |
| Horizontal polymerization vessel II | 0.5 | 305 | 0.5 |

The molten bisphenol A from the pipe directly connected to the bisphenol A manufacturing apparatus (supply rate, 36.0 kg/hr); the molten diphenyl carbonate from the pipe directly after distillation (supply rate, 34.7 kg/hr); and the designated amount of phenol solution of a catalyst were continuously supplied to the agitator vessel, which was maintained at the temperature shown above. This mixture was sequentially supplied (at a supply rate equivalent to 36.0 kg/hr of bisphenol A) to prepolymerization vessel I, prepolymerization vessel II, horizontal polymerization vessel I, and horizontal polymerization vessel II, and polymerized under the reaction conditions shown above in order to manufacture the polycarbolate.

The intrinsic viscosity, concentration of terminal OH groups, polycarbonate color, and amount of branching of the manufactured polycarbonates were then determined. The results are shown in Table 2.

The alkali metal compounds and alkaline earth metal compounds in the bisphenol A and diphenyl carbonate used as starting materials were less than $1 \times 10^{-7}$ mole per 1 mole of the dihydroxy compound. More specifically, the amounts were below detectable limits.

Working Examples 2 to 9, Comparison Examples 1 to 9

Polycarbonates were also manufactured by a process similar to Working Example 1, but with different types and/or amounts of catalysts. The results are presented in Table 2.

TABLE 2

|  | Catalyst | | Polycarbonate | | | | |
|---|---|---|---|---|---|---|---|
|  | Catalyst | Amount of Catalyst (× $10^{-6}$ mol/BPA) | IV (dl/g) | Concentration of Terminal OH Groups (%) | YI | Branched Compound (1)(ppm) | Branched Compound (2)(ppm) |
| Working example 1 | LiH$_2$PO$_3$ | 1.5 | 0.54 | 15 | 0.95 | 210 | <10 |
| Working example 2 | LiH$_2$PO$_3$ | 1.0 | 0.51 | 17 | 0.93 | 150 | <10 |
| Working example 3 | LiH$_2$PO$_3$ | 0.5 | 0.45 | 19 | 0.93 | 90 | <10 |
| Working example 4 | NaH$_2$PO$_3$ | 1.5 | 0.55 | 13 | 0.96 | 260 | <10 |
| Working example 5 | NaH$_2$PO$_3$ | 1.0 | 0.52 | 15 | 0.94 | 180 | <10 |
| Working example 6 | NaH$_2$PO$_3$ | 0.5 | 0.46 | 17 | 0.93 | 110 | <10 |
| Working example 7 | KH$_2$PO$_3$ | 1.5 | 0.57 | 13 | 0.98 | 380 | <10 |
| Working example 8 | KH$_2$PO$_3$ | 1.0 | 0.54 | 14 | 0.95 | 250 | <10 |
| Working example 9 | KH$_2$PO$_3$ | 0.5 | 0.48 | 13 | 0.94 | 180 | <10 |
| Comparison example 1 | NaH$_2$PO$_4$ | 3.0 | 0.30 | 38 | Could not mold | <10 | <10 |

TABLE 2-continued

|  | Catalyst | | Polycarbonate | | | | |
| --- | --- | --- | --- | --- | --- | --- | --- |
|  | Catalyst | Amount of Catalyst (× 10⁻⁶ mol/BPA) | IV (dl/g) | Concentration of Terminal OH Groups (%) | YI | Branched Compound (1)(ppm) | Branched Compound (2)(ppm) |
| Comparison example 2 | NaH$_2$PO$_4$ | 2.0 | 0.29 | 41 | Could not mold | <10 | <10 |
| Comparison example 3 | KH$_2$PO$_4$ | 3.0 | 0.31 | 37 | Could not mold | <10 | <10 |
| Comparison example 4 | KH$_2$PO$_4$ | 2.0 | 0.30 | 39 | Could not mold | <10 | <10 |
| Comparison example 5 | LiOH | 1.0 | 0.53 | 14 | 1.23 | 1530 | 80 |
| Comparison example 6 | NaOH | 1.0 | 0.55 | 15 | 1.24 | 2120 | 120 |
| Comparison example 7 | NaOH | 0.5 | 0.52 | 17 | 1.15 | 1210 | 70 |
| Comparison example 8 | KOH | 1.0 | 0.56 | 13 | 1.28 | 2370 | 140 |
| Comparison example 9 | KOH | 0.5 | 0.53 | 16 | I.20 | 1450 | 70 |

Working Examples 10 to 19 and Comparative Examples 10 to 20

Polycarbonates were manufactured in the same manner as in Working Example 1 except that the types of catalyst and the usage amounts were varied as shown in Table 1.

These results are given in Table 3.

TABLE 3

| | Catalyst | | | | Polycarbonate | | | | |
| --- | --- | --- | --- | --- | --- | --- | --- | --- | --- |
| | Alkali metal compound | | Compound that decomposes or volatizes at 100 to 300° C. | | | Terminal OH group concen- | | Branched Compound | Branched Compound |
| | Type of catalyst | Amount of catalyst (× 10⁻⁶ mol/BPA) | Type of catalyst | Amount of catalyst | IV (dl/g) | tration (%) | YI | (1) (ppm) | (2) (ppm) |
| Working Example 10 | LiH$_2$PO$_3$ | 1.5 | Me$_4$NOH | 5 × 10⁻⁵ | 0.52 | 8 | 0.95 | 220 | <10 |
| Working Example 11 | LiH$_2$PO$_3$ | 1.0 | Me$_4$NOH | 5 × 10⁻⁵ | 0.49 | 6 | 0.93 | 150 | <10 |
| Working Example 12 | LiH$_2$PO$_3$ | 0.5 | Me$_4$NOH | 5 × 10⁻⁵ | 0.44 | 9 | 0.93 | 100 | <10 |
| Working Example 13 | NaH$_2$PO$_3$ | 1.5 | Me$_4$NOH | 5 × 10⁻⁵ | 0.53 | 7 | 0.96 | 260 | <10 |
| Working Example 14 | NaH$_2$PO$_3$ | 1.0 | Me$_4$NOH | 5 × 10⁻⁵ | 0.50 | 8 | 0.93 | 190 | <10 |
| Working Example 15 | NaH$_2$PO$_3$ | 0.5 | Me$_4$NOH | 5 × 10⁻⁵ | 0.43 | 8 | 0.92 | 120 | <10 |
| Working Example 16 | KH$_2$PO$_3$ | 1.5 | Me$_4$NOH | 5 × 10⁻⁵ | 0.55 | 6 | 0.97 | 370 | <10 |
| Working Example 17 | KH$_2$PO$_3$ | 1.0 | Me$_4$NOH | 5 × 10⁻⁵ | 0.52 | 6 | 0.95 | 260 | <10 |
| Working Example 18 | KH$_2$PO$_3$ | 0.5 | Me$_4$NOH | 5 × 10⁻⁵ | 0.45 | 7 | 0.94 | 190 | <10 |
| Working Example 19 | NaH$_2$PO$_3$ | 1.0 | Bu$_4$POH | 5 × 10⁻⁵ | 0.51 | 7 | 0.93 | 180 | <10 |
| Comparative Example 10 | NaH$_2$PO$_4$ | 3.0 | Me$_4$NOH | 5 × 10⁻⁵ | 0.27 | 32 | Molding impossible | <10 | <10 |
| Comparative Example 11 | NaH$_2$PO$_4$ | 2.0 | Me$_4$NOH | 5 × 10⁻⁵ | 0.26 | 35 | Molding impossible | <10 | <10 |
| Comparative Example 12 | KH$_2$PO$_4$ | 3.0 | Me$_4$NOH | 5 × 10⁻⁵ | 0.30 | 31 | Molding impossible | <10 | <10 |
| Comparative Example 13 | KH$_2$PO$_4$ | 2.0 | Me$_4$NOH | 5 × 10⁻⁵ | 0.28 | 33 | Molding impossible | <10 | <10 |

TABLE 3-continued

| | Catalyst | | | | Polycarbonate | | | | |
|---|---|---|---|---|---|---|---|---|---|
| | Alkali metal compound | | Compound that decomposes or volatizes at 100 to 300° C. | | | Terminal OH group concentration (%) | | Branched Compound (1) (ppm) | Branched Compound (2) (ppm) |
| | Type of catalyst | Amount of catalyst (× 10⁻⁶ mol/BPA) | Type of catalyst | Amount of catalyst | IV (dl/g) | | YI | | |
| Comparative Example 14 | LiOH | 1.0 | Me$_4$NOH | 5 × 10⁻⁵ | 0.51 | 7 | 1.24 | 1560 | 90 |
| Comparative Example 15 | NaOH | 1.0 | Me$_4$NOH | 5 × 10⁻⁵ | 0.53 | 7 | 1.24 | 2100 | 130 |
| Comparative Example 16 | NaOH | 0.5 | Me$_4$NOH | 5 × 10⁻⁵ | 0.50 | 6 | 1.16 1.24 | 1240 | 80 |
| Comparative Example 17 | KOH | 1.0 | Me$_4$NOH | 5 × 10⁻⁵ | 0.53 | 6 | 1.27 | 2380 | 150 |
| Comparative Example 18 | KOH | 0.5 | Me$_4$NOH | 5 × 10⁻⁵ | 0.51 | 6 | 1.21 | 1470 | 80 |
| Comparative Example 19 | NaH$_2$PO$_4$ | 2.0 | Bu$_4$PO$_H$ | 5 × 10⁻⁵ | 0.27 | 34 | Molding impossible | <10 | <10 |
| Comparative Example 20 | NaOH | 1.0 | Bu$_4$PO$_H$ | 5 × 10⁻⁵ | 0.53 | 7 | 1.26 | 1520 | 80 |

Working Example 20

The apparatus used for the polymerization of the polycarbonate was equipped with one agitation tank for mixing the raw materials, two prepolymerization tanks, and two horizontal polymerization tanks. The various reaction conditions were as given below.

TABLE 4

| | Pressure (torr) | Temperature (° C.) | Mean residence time (hours) |
|---|---|---|---|
| Agitation tank | atmospheric pressure (nitrogen atmosphere) | 160 | 2 |
| Prepolymerization tank I | 100 | 230 | 1 |
| Prepolymerization tank II | 20 | 270 | 0.5 |
| Horizontal agitation and polymerization tank I | 2 | 300 | 0.5 |
| Horizontal agitation and polymerization tank II | 0.5 | 300 | 0.5 |

The added amount of phenol solution of 0.5% sodium hydroxide was adjusted such that the exhibited basicity would be equivalent to the amount shown in Table 4 as NaOH per mole of bisphenol A manufactured in the bisphenol A manufacturing apparatus, and molten bisphenol A (feed rate: 36.0 kg/hr) that had been pumped directly from a pipe, molten diphenyl carbonate (feed rate: 35.5 kg,/hr) that had been pumped directly from a pipe after distillation, and a phenol solution of a catalyst that decomposes at 100 to 300° C. were continuously supplied in the amounts shown in Table 4 to an agitation tank maintained at the temperature given above. Next, a phenol solution of the specified amount of alkali metal phosphite catalyst was continuously supplied to prepolymerization tank I, which was maintained at the temperature given above, and was supplied to prepolymerization tank I, prepolymerization tank II, horizontal polymerization tank I, and horizontal polymerization tank II in that order at a feed rate of 36.0 kg/hr, calculated as bisphenol A. Polymerization was conducted under the reaction conditions given above to manufacture a polycarbonate. The total amount of alkali metal compound and alkaline earth metal compound in the raw material bisphenol A and diphenyl carbonate was confirmed to be the amount give in Table 4 as NaOH.

Working Examples 21 to 32 and Comparative Examples 21 to 25

Polycarbonates were manufactured in the same manner as Working Example 20 except that the types of catalyst and the usage amounts were varied as shown in Table 5.

These results are given in Table 5.

TABLE 5

| | Amount at which catalytic performance equivalent to the NAOH contained in the raw material is exhibited (× 10⁻⁷ mol/BPA) | Alkali metal compound | | Compound that decomposes or volatizes at 100 to 300° C. | | IV (dl/g) | Terminal OH group concentration (%) | YI | Branched compound (1) (ppm) | Branched compound (2) (ppm) |
|---|---|---|---|---|---|---|---|---|---|---|
| | | Type of catalyst | Amount of catalyst (× 10⁻⁶ mol/BPA) | Type of catalyst | Amount of catalyst (× 10⁻⁵ mol/BPA) | | | | | |
| Working Example 20 | 3.0 | LiH$_2$PO$_3$ | 1.5 | Me$_4$NOH | 5.0 | 0.44 | 6 | 0.92 | 630 | <10 |

TABLE 5-continued

| | Amount at which catalytic performance equivalent to the NAOH contained in the raw material is exhibited (× 10⁻⁷ mol/BPA) | Alkali metal compound | | Compound that decomposes or volatizes at 100 to 300° C. | | IV (dl/g) | Terminal OH group concentration (%) | YI | Branched compound (1) (ppm) | Branched compound (2) (ppm) |
|---|---|---|---|---|---|---|---|---|---|---|
| | | Type of catalyst | Amount of catalyst (× 10⁻⁶ mol/BPA) | Type of catalyst | Amount of catalyst (× 10⁻⁵ mol/BPA) | | | | | |
| Working Example 21 | 3.0 | LiH₂PO₃ | 1.0 | Me₄NOH | 5.0 | 0.41 | 6 | 0.9 | 430 | <10 |
| Working Example 22 | 3.0 | LiH₂PO₃ | 0.5 | Me₄NOH | 5.0 | 0.37 | 7 | 0.89 | 280 | <10 |
| Working Example 23 | 3.0 | NaH₂PO₃ | 1.5 | Me₄NOH | 5.0 | 0.45 | 5 | 0.92 | 720 | <10 |
| Working Example 24 | 3.0 | NaH₂PO₃ | 1.0 | Me₄NOH | 5.0 | 0.42 | 6 | 0.9 | 540 | <10 |
| Working Example 25 | 3.0 | NaH₂PO₃ | 0.5 | Me₄NOH | 5.0 | 0.36 | 6 | 0.89 | 400 | <10 |
| Working Example 26 | 3.0 | KH₂PO₃ | 1.5 | Me₄NOH | 5.0 | 0.46 | 4 | 0.94 | 980 | <10 |
| Working Example 27 | 3.0 | KH₂PO₃ | 1.0 | Me₄NOH | 5.0 | 0.43 | 4 | 0.91 | 710 | <10 |
| Working Example 28 | 3.0 | KH₂PO₃ | 0.5 | Me₄NOH | 5.0 | 0.38 | 5 | 0.9 | 550 | <10 |
| Working Example 29 | 3.0 | NaH₂PO₄ | 3.0 | Me₄NOH | 5.0 | 0.38 | 10 | 0.88 | 640 | <10 |
| Working Example 30 | 3.0 | NaH₂PO₄ | 2.0 | Me₄NOH | 5.0 | 0.36 | 11 | 0.87 | 610 | <10 |
| Working Example 31 | 3.0 | KH₂PO₄ | 3.0 | Me₄NOH | 5.0 | 0.37 | 9 | 0.89 | 590 | <10 |
| Working Example 21 | 3.0 | KH₂PO₄ | 2.0 | Me₄NOH | 5.0 | 0.36 | 7 | 0.88 | 570 | <10 |
| Comparative Example 21 | 3.0 | LiOH | 1.0 | Me₄NOH | 5.0 | 0.43 | 5 | 1.12 | 1300 | 50 |
| Comparative Example 22 | 3.0 | NaOH | 1.0 | Me₄NOH | 5.0 | 0.45 | 5 | 1.13 | 1740 | 60 |
| Comparative Example 23 | 3.0 | NaOH | 0.5 | Me₄NOH | 5.0 | 0.43 | 4 | 1.04 | 1030 | <10 |
| Comparative Example 24 | 3.0 | KOH | 1.0 | Me₄NOH | 5.0 | 0.45 | 4 | 1.15 | 1920 | 60 |
| Comparative Example 25 | 3.0 | KOH | 0.5 | Me₄NOH | 5.0 | 0.43 | 4 | 1.14 | 1280 | 10 |

Working Examples 33 to 35 and Comparative Examples 26 to 29

Polycarbonates were manufactured in the same manner as in Working Example 1 except that the types of catalyst and the usage amounts were varied as shown in Table 6.

These results are given in Table 6

TABLE 6

| | Alkali metal phosphite | | | Compound that decomposes or volatilizes at 100 to 300° C. | | | IV (dl/g) | Terminal OH group concentration (%) | YI | Branched compound (1) (ppm) | Branched Compound (2) (ppm) |
|---|---|---|---|---|---|---|---|---|---|---|---|
| | Type of catalyst | Amount of catalyst (× 10⁻⁶ mol/BPA) | Location of addition | Type of catalyst | Amount of catalyst (× 10⁻⁵ mol/BPA) | Location of addition | | | | | |
| Working Example 33 | LiH₂PO₃ | 1.0 | Prepolymerization tank I | Me₄NOH | 5.0 | Agitation tank | 0.49 | 8 | 0.93 | 150 | <10 |
| Working Example 34 | NaH₂PO₃ | 1.0 | Prepolymerization tank I | Me₄NOH | 5.0 | Agitation tank | 0.50 | 8 | 0.93 | 190 | <10 |
| Working Example 35 | KH₂PO₃ | 1.0 | Prepolymerization tank I | Me₄NOH | 5.0 | Agitation tank | 0.52 | 6 | 0.95 | 260 | <10 |
| Working Example 36 | NaH₂PO₄ | 1.0 | Prepolymerization tank I | Me₄NOH | 5.0 | Agitation tank | 0.51 | 7 | 0.93 | 180 | <10 |
| Comparative Example 26 | LiH₂PO₃ | 1.0 | Agitation tank | Me₄NOH | 5.0 | Agitation tank | 0.50 | 7 | 1.08 | 1180 | 60 |

TABLE 6-continued

| | Alkali metal phosphite | | | Compound that decomposes or volatilizes at 100 to 300° C. | | | IV (dl/g) | Terminal OH group concentration (%) | YI | Branched compound (1) (ppm) | Branched Compound (2) (ppm) |
|---|---|---|---|---|---|---|---|---|---|---|---|
| | Type of catalyst | Amount of catalyst ($\times 10^{-6}$ mol/BPA) | Location of addition | Type of catalyst | ($\times 10^{-5}$ mol/BPA) | Location of addition | | | | | |
| Comparative Example 27 | $NaH_2PO_3$ | 1.0 | Agitation tank | $Me_4NOH$ | 5.0 | Agitation tank | 0.50 | 5 | 1.13 | 1200 | 70 |
| Comparative Example 28 | $KH_2PO_3$ | 1.0 | Agitation tank | $Me_4NOH$ | 5.0 | Agitation tank | 0.51 | 6 | 1.15 | 1290 | 70 |
| Comparative Example 29 | $NaH_2PO_4$ | 1.0 | Agitation tank | $Me_4NOH$ | 5.0 | Agitation tank | 0.52 | 6 | 1.14 | 1230 | 70 |

What is claimed is:

1. A method for manufacturing a polycarbonate comprising using an ester interchange reaction of raw materials comprising a dihydroxy compound and a carbonic acid diester:
wherein prior to the interchange reaction the dihydroxy compound and the carbonate diester used contain no greater than a total $1 \times 10^{-7}$ mole of alkali metal compounds of alkaline earth metal compounds as impurities per 1 mole of the dihydroxy compound and during the interchange reaction an alkali metal phosphite inorganic salt is used as a catalyst.

2. A method for manufacturing a polycarbonate as described in claim 1, wherein said amount of alkali metal phosphate inorganic salt is $1 \times 10^{-7}$ to $2 \times 10^{-6}$ mole per mole of dihydroxy compound.

3. A method for manufacturing a polycarbonate as described in claim 1, wherein said alkali metal phosphite inorganic salt comprises at least one compound selected from lithium dihydrogen phoslite, sodium dihydrogen phosphite, and potassium dihydrogen phosphite.

4. A method for manufacturing a polycarbonate as described in claim 1, further comprising using a compound that decomposes or volatilizes at a temperature of 100 to 300° C. as a catalyst.

5. A method for manufacturing a polycarbonate as described in claim 1, wherein said compound that decomposes or volatilizes at a temperature of 100 to 300° C. comprises at least one type of compound selected from ammonium compounds and phosphonium compounds.

6. A method for manufacturing a polycarbonate as described in claim 1, wherein said compound that decomposes or volatilizes at a temperature of 100 to 300° C. is at least one type of compound selected from quaternary ammonium compounds and quaternary phosphonium compounds.

7. A method for manufacturing a polycarbonate comprising using an ester interchange reaction in which a dihydroxy compound and a carbonic acid diester are the raw materials;
wherein said ester interchange reaction is conducted in a multi-stage polycondensation step of two or more stages;
(a) at least one type of compound selected from among ammonium compounds and phosphonium compounds is used as a catalyst in a first stage of the polycondensation step and at a temperature of 270° C. or less and a pressure in an amount of atmospheric pressure to 100 torr; and
(b) an alkali metal phosphite inorganic salt is used as a catalyst in a second stage of the polycondensation step at a temperature of 240° C. to 320° C. and a pressure of 5 torr or less, wherein the temperature and pressure are effective to volatize the first stage catalyst.

8. A method for manufacturing a polycarbonate as described in claim 7 wherein:
(a) at least one type of compound selected from among ammonium compounds and phosphonium compounds is used in an amount of $1 \times 10^{-7}$ to $1 \times 10^{-1}$ mol; and
(b) a salt composed of an alkali metal phosphorus-containing inorganic salt and/or an alkaline earth metal phosphorus-containing inorganic salt is used in an amount of $1 \times 10^{-7}$ to $1 \times 10^{-6}$ mole per mole of dihydroxy compound.

9. A method for manufacturing a polycarbonate as described in claim 7, wherein the amount of alkali metal compound and/or alkaline earth metal compound contained as impurities in the raw materials is $1 \times 10^{-7}$ mole per mole of dihydroxy compound.

10. A method for manufacturing a polycarbonate as described in claim 7, wherein at least one type of compound selected from ammonium compounds and phosphonium compounds is at least one type of compound selected from quaternary ammonium compounds and quaternary phosphonium compounds.

11. A method for manufacturing a polycarbonate as described in claim 1, wherein the alkali metal phosphite is a compound selected from group consisting of lithium dihydrogen phosphite, sodium dihydrogen phosphite, potassium dihydrogen phosphite, rubidium dihydrogen phosphite, cesium dihydrogen phosphite, dilithium hydrogen phosphite, disodium hydrogen phosphite, dipotassium hydrogen phosphite, dirubidium hydrogen phosphite, dicesium hydrogen phosphite, trilithium phosphite, trisodium phosphite, tripotassium phosphite, trirubidium phosphite, tricesium phosphite and mixtures thereof.

12. A polycarbonate article manufactured in accordance with the process of claim 7, wherein the polycarbonate is substantially a linear polycarbonate comprising less than 1500 ppm of a branched polycarbonate structure.

* * * * *